United States Patent
Wang et al.

(10) Patent No.: US 11,585,667 B2
(45) Date of Patent: Feb. 21, 2023

(54) SYSTEMS AND METHODS FOR SIMULATING EDGE-COMPUTING DEPLOYMENT IN DIVERSE TERRAINS

(71) Applicant: Toyota Motor Engineering & Manufacturing North America, Inc., Plano, TX (US)

(72) Inventors: Haoxin Wang, Mountain View, CA (US); BaekGyu Kim, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 391 days.

(21) Appl. No.: 16/944,645

(22) Filed: Jul. 31, 2020

(65) Prior Publication Data

US 2022/0034670 A1 Feb. 3, 2022

(51) Int. Cl.
*G01C 21/00* (2006.01)
*G01C 21/34* (2006.01)
(Continued)

(52) U.S. Cl.
CPC ..... *G01C 21/3461* (2013.01); *G06F 9/45558* (2013.01); *G06T 19/006* (2013.01);
(Continued)

(58) Field of Classification Search
CPC ............. G01C 21/3461; G06F 9/45558; G06F 2009/4557; G06F 8/60; G06F 9/455;
(Continued)

(56) References Cited

U.S. PATENT DOCUMENTS 7,257,524 B2 * 8/2007 Schilp ..................... G06F 30/33
703/27
7,657,406 B2 2/2010 Tolone et al.
(Continued)

OTHER PUBLICATIONS

Choffnes et al., "An integrated Mobility and Traffic Model for Vehicular Wireless Networks", VANET'05, Sep. 2, 2005, Cologne, Germany.
(Continued)

*Primary Examiner* — Ian Jen
(74) *Attorney, Agent, or Firm* — Christopher G. Darrow; Darrow Mustafa PC

(57) ABSTRACT

Systems and methods described herein relate to simulating edge-computing deployment in diverse terrains. One embodiment receives a layer-selection input specifying which layers among a plurality of layers in a simulation model of an edge-computing deployment are to be included in a simulation experiment; receives a set of input parameters for each of the layers specified by the layer-selection input, the set of input parameters for one of the layers specified by the layer-selection input including selection of a vehicular application whose performance in the edge-computing deployment is to be evaluated via the simulation experiment; executes the simulation experiment in accordance with the layer-selection input and the set of input parameters for each of the layers specified by the layer-selection input; and outputs, from the simulation experiment, performance data for the selected vehicular application in the edge-computing deployment.

20 Claims, 5 Drawing Sheets

(51) Int. Cl.
*G08G 1/0968* (2006.01)
*G06T 19/00* (2011.01)
*G08G 1/127* (2006.01)
*G07C 5/00* (2006.01)
*G06F 9/455* (2018.01)

(52) U.S. Cl.
CPC ....... *G07C 5/008* (2013.01); *G08G 1/096822* (2013.01); *G08G 1/127* (2013.01); *G06F 2009/4557* (2013.01)

(58) Field of Classification Search
CPC .................. G06T 19/006; G07C 5/008; G08G 1/096822; G08G 1/127; G08G 1/0129; G08G 1/14; G08G 1/0112
See application file for complete search history.

(56) References Cited

U.S. PATENT DOCUMENTS

| | | | |
|---|---|---|---|
| 10,110,495 | B1 | 10/2018 | Sabella et al. |
| 10,235,480 | B2 | 3/2019 | Broodney et al. |
| 2003/0171908 | A1* | 9/2003 | Schilp .................... G06F 30/33 703/16 |
| 2013/0285855 | A1 | 10/2013 | Dupray et al. |
| 2016/0291826 | A1 | 10/2016 | Verzano |
| 2019/0356556 | A1 | 11/2019 | Vicat-Blanc |

OTHER PUBLICATIONS

Moubayed et al., "Edge-enabled V2X Service Placement for Intelligent Transportation Systems", found at: arXiv:2001.06288v1 [eess.SP] Jan. 13, 2020.
Huang et al., "Scheduling for Mobile Edge Computing with Random user Arrivals", found at: arXiv:2004.07553v1 [cs.IT] Apr. 16, 2020.
Jha et al. "IoTSim-Edge A Simulation Framework for Modeling the behaviour of IoT and Edge Computing environments", found at: arXiv:1910.03026 (Oct. 2019).
Jiang et al., "AI Driven Heterogeneous MEC System for Dynamic Environment Challenges and Solutions", found at: arXiv:2002.05020v1 [eess.SP] Feb. 11, 2020.
Liu et al., "Adaptive Task Partitioning at Local Device or Remote Edge server for offloading in MEC", found at: arXiv:2002.04858v1 [cs.NI] Feb. 12, 2020.
Kim et al., "Joint Optimization of Signal Design and Resource Allocation in Wireless D2D Edge Computing", found at: arXiv:2002.11850v3 [cs.NI] Mar. 4, 2020.
Zhang et al., "Mobile Edge Intelligence and Computing for the Internet of Vehicles", found at: arXiv:1906.00400v1 [cs.NI] Jun. 2, 2019.
U.S. Appl. No. 16/944,522 titled "Systems and Methods for Generating a Task Offloading Strategy for a Vehicular Edge-Computing Environment", filed Jul. 31, 2020.

* cited by examiner

SYSTEMS AND METHODS FOR SIMULATING EDGE-COMPUTING DEPLOYMENT IN DIVERSE TERRAINS

TECHNICAL FIELD

The subject matter described herein relates in general to connected vehicles and, more specifically, to systems and methods for simulating edge-computing deployment in diverse terrains.

BACKGROUND

Connected vehicles—vehicles that can communicate bidirectionally over a network with infrastructure systems and, in some applications, other vehicles—are becoming mainstream and are expected to be widely deployed within a few years. One technology that supports this connected-vehicle future is edge computing. Edge computing can benefit connected vehicles for several reasons. For example, edge computing can enable computation-intensive and latency-critical applications despite the computation-resource limitations of the connected vehicles themselves. Also, edge computing permits connected vehicles to share important data such as sensor data with one another.

In a real-world environment, however, edge-computing system deployment faces several challenges, such as deployment, maintenance, and service costs; the stringent requirements of vehicular applications (e.g., low latency requirements); and the need to deploy edge-computing systems in diverse regions with different geographic features. Examples include traffic circles, intersections, bridges, and expressway on-ramps and off-ramps. The challenge, then, becomes how to deploy the infrastructure equipment of an edge-computing system, such as roadside units (RSUs) and base stations (BSs), in diverse terrains in a manner that meets the requirements of various vehicular applications while, at the same time, minimizing the deployment, maintenance, and service costs.

SUMMARY

Embodiments of a system for simulating edge-computing deployment in diverse terrains are presented herein. In one embodiment, the system comprises one or more processors and a memory communicably coupled to the one or more processors. The memory stores an input module including instructions that when executed by the one or more processors cause the one or more processors to receive a layer-selection input specifying which layers among a plurality of layers in a simulation model of an edge-computing deployment are to be included in a simulation experiment. The input module also includes instructions that when executed by the one or more processors cause the one or more processors to receive a set of input parameters for each of the layers specified by the layer-selection input, the set of input parameters for one of the layers specified by the layer-selection input including selection of a vehicular application whose performance in the edge-computing deployment is to be evaluated via the simulation experiment. The memory also stores a simulation module including instructions that when executed by the one or more processors cause the one or more processors to execute the simulation experiment in accordance with the layer-selection input and the set of input parameters for each of the layers specified by the layer-selection input. The memory also stores an output module including instructions that when executed by the one or more processors cause the one or more processors to output, from the simulation experiment, performance data for the selected vehicular application in the edge-computing deployment.

Another embodiment is a non-transitory computer-readable medium for simulating edge-computing deployment in diverse terrains and storing instructions that when executed by one or more processors cause the one or more processors to receive a layer-selection input specifying which layers among a plurality of layers in a simulation model of an edge-computing deployment are to be included in a simulation experiment. The instructions also cause the one or more processors to receive a set of input parameters for each of the layers specified by the layer-selection input, the set of input parameters for one of the layers specified by the layer-selection input including selection of a vehicular application whose performance in the edge-computing deployment is to be evaluated via the simulation experiment. The instructions also cause the one or more processors to execute the simulation experiment in accordance with the layer-selection input and the set of input parameters for each of the layers specified by the layer-selection input. The instructions also cause the one or more processors to output, from the simulation experiment, performance data for the selected vehicular application in the edge-computing deployment.

Another embodiment is a method of simulating edge-computing deployment in diverse terrains, the method comprising receiving a layer-selection input specifying which layers among a plurality of layers in a simulation model of an edge-computing deployment are to be included in a simulation experiment. The method also includes receiving a set of input parameters for each of the layers specified by the layer-selection input, the set of input parameters for one of the layers specified by the layer-selection input including selection of a vehicular application whose performance in the edge-computing deployment is to be evaluated via the simulation experiment. The method also includes executing the simulation experiment in accordance with the layer-selection input and the set of input parameters for each of the layers specified by the layer-selection input. The method also includes outputting, from the simulation experiment, performance data for the selected vehicular application in the edge-computing deployment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Various embodiments of a techno-economic simulation platform for simulating edge-computing deployment in diverse terrains are described herein. Such a simulation platform enables both technical/engineering-performance and economic-cost metrics to be assessed. In various embodiments, the simulation platform includes a plurality of layers, and a user can specify which layers to include in a given simulation experiment. That is, the user can specify different combinations of layers (different subsets of layers) among the plurality of layers available in the simulation model. For example, in one embodiment, the simulation platform includes a cloud layer, an edge layer, a radio access layer, a vehicular edge layer, a terrain and vehicle layer, and a pedestrian layer. In this embodiment, the simulation platform receives a layer-selection input specifying which layers among the plurality of layers are to be included in the simulation experiment, and the simulation platform receives a set of input parameters for each deployed layer. The set of input parameters for one of the layers (e.g., the edge layer) specified by the layer-selection input includes selection of a vehicular application whose performance in the edge-computing deployment is to be evaluated via the simulation experiment. The selected vehicular application can be any of a variety of connected-vehicle applications, but some examples include, without limitation, in-vehicle augmented reality, high-definition (HD) map generation, intelligent driving, and edge-assisted adaptive cruise control.

The simulation platform then executes the simulation experiment in accordance with the layer-selection input and the set of input parameters for each of the layers specified by the layer-selection input, outputting performance data for the selected vehicular application in the edge-computing deployment. For example, in one embodiment, the simulation platform can output deployment and maintenance cost per month, average service latency per task, average service fee per task, and whether predetermined service requirements are achieved.

In some embodiments, the simulation platform receives, from a user, one or more inputs pertaining to evaluating an offloading strategy involving one or more of a cloud server in the cloud layer, an edge server in the edge layer, and one or more vehicular edge groups in the vehicular edge layer. Those inputs can specify offloading priorities or preferences among those network nodes. Also, in some embodiments, the simulation platform permits a user to evaluate the impact, on the performance of vehicular applications, of pedestrians' behaviors and activities (e.g., their movements in the environment and their use of mobile communication devices such as smartphones).

Figure 1:
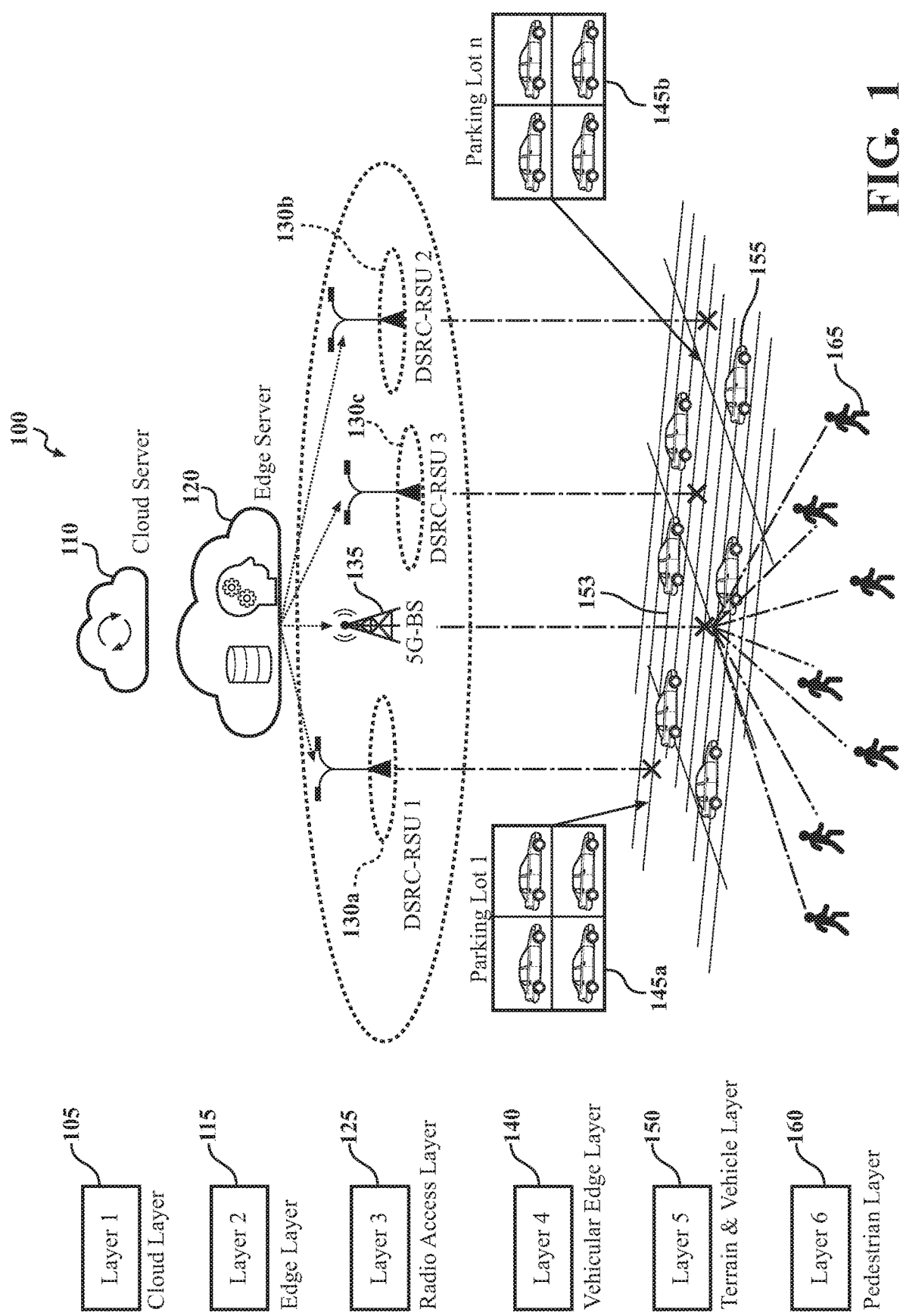
FIG. 1 is a diagram of a simulation platform for simulating edge-computing deployment in diverse terrains, in accordance with an illustrative embodiment of the invention.

Referring to FIG. 1, it is a diagram of a simulation platform 100 for simulating edge-computing deployment in diverse terrains, in accordance with an illustrative embodiment of the invention. As shown in FIG. 1, simulation platform 100 is divided into a plurality of layers: (1) a cloud layer 105 that includes a cloud server 110; (2) an edge layer 115 that includes an edge server 120; (3) a radio access layer 125 that includes one or more roadside units (RSUs) and/or base stations (BSs) such as DSRC-RSU 1 (130a), DSRC-RSU 2 (130b), DSRC-RSU 3 (130c), and 5G-BS 135; (4) a vehicular edge layer 140 that includes one or more vehicular edge groups (discussed in greater detail below), such as vehicular edge group 145a in Parking Lot 1 and vehicular edge group 145b in Parking Lot n; a terrain and vehicle layer 150 that includes a terrain model 153 specifying the characteristics (geometry, etc.) of terrain in a geographic area and one or more vehicles 155; and a pedestrian layer 160 that includes one or more simulated pedestrians 165. Each of these layers is discussed in further detail below.

Cloud server 110 in cloud layer 105 can communicate directly with vehicles 155 to provide an additional option for offloading data/tasks, if the edge server 120 in edge layer 115 does not have available computational capacity. One difference, however, is that the cloud server 110 will generally have a higher communication latency compared with edge server 120. In one embodiment, the set of input parameters for cloud layer 105 includes one or more of the following: supported vehicular applications, selection of a communication model for communication between cloud server 110 and one or more vehicles 155 in the terrain and vehicle layer 150, the number of virtual machines allocated to cloud server 110 and their associated computational performance, and the costs (e.g., taxes) associated with a specified geographic region.

Edge layer 115, in this embodiment, is the layer whose set of input parameters includes selection of a vehicular application whose performance in the simulated edge-computing deployment is to be evaluated via a simulation experiment in simulation platform 100. As mentioned above, the selected vehicular application can include without limitation, in-vehicle augmented reality, high-definition (HD) map generation, intelligent driving, and edge-assisted adaptive cruise control. As those skilled in the art are aware, "intelligent driving" is a broad term that includes a variety of assisted-driving applications such as adaptive cruise control, lane-change assistance, backup assistance, blind-spot detection, collision/pedestrian avoidance, etc. In some embodiments, a user can choose to run the simulation experiment using analytical models that simulate the vehicular applications. In other embodiments, the user can choose to run the simulation experiment using the actual vehicular application program code itself. As discussed further below, edge layer 115 can provide computational resources (data/task offloading) to vehicles 155, when needed, to prevent the vehicles' limited computational resources from being overwhelmed.

One important aspect of the various embodiments discussed herein is the ability to simulate offloading strategies that reduce the computational burden of connected vehicles. For example, in some embodiments, simulation platform 100 receives one or more inputs pertaining to evaluating an offloading strategy involving one or more of a cloud server 110 in the cloud layer 105, an edge server 120 in the edge layer 115, and one or more vehicular edge groups 145 in the vehicular edge layer 140. In one embodiment, the one or more inputs just mentioned include specifying offloading priorities among the cloud server 110, the edge server 120, and one or more vehicular edge groups 145. For example, such an input could specify that a task should always be offloaded to the vehicular edge layer 140 first, the edge server 120 and cloud server 110 being second and third choices, respectively.

Radio access layer 125 can include, in its set of input parameters, the number of RSUs and BSs and their corresponding locations (e.g., coordinates within the simulated geographic region). In some embodiments, the RSUs are Dedicated Short Range Communications (DSRC) RSUs (DSRC-RSUs), and the BSs are 5G-BSs, as depicted in FIG. 1. Additional input parameters can include the carrier frequencies and bandwidths of the selected RSUs and BSs, a data-transmission pricing model, and a deployment and maintenance cost model.

Vehicular edge layer 140 models a layer in which groups of vehicles ("vehicular edge groups" 145) in relatively close proximity (e.g., within a parking lot) are directly networked with one another (e.g., in a mesh network, in one embodiment) to provide computational resources to other nearby connected vehicles 155 that are not part of any vehicular edge group 145 and that need data/task offloading to avoid becoming computationally overburdened. Thus, a vehicular edge group 145 provides an offloading functionality similar to that of an edge server 120 and makes use of idle computation capacity in the vehicles that form an ad-hoc vehicular edge group 145. In some embodiments, this could include forming a distributed virtual machine among the vehicles in a vehicular edge group 145. In one embodiment, the vehicles in the group communicate with one another directly via DSRC (vehicle-to-vehicle or "V2V" communication), and one of the vehicles is designated as a leader in communicating with other vehicles in the group. In some embodiments, a vehicular edge group 145 in vehicular edge layer 140 takes the place of an edge server 120 (or a cloud server 110). In other embodiments, the vehicular edge group 145 might be in communication with the edge server 120 and/or the cloud server 110.

In one embodiment, the set of input parameters for vehicular edge layer 140 includes one or more of the following: the number of vehicles in a given vehicular edge group 145, the computational capacity of the individual vehicles in a given vehicular edge group 145, the available communication bandwidth, the cost of data transmission service and computational resources, and options regarding the availability of computational and storage resources in the individual vehicles in a given vehicular edge group 145 and the willingness of vehicle owners of the individual vehicles in a given vehicular edge group 145 to share their computational and storage resources. This last input parameter regarding owner willingness is relevant because the participation of a vehicle 155 in a vehicular edge group 145 and the consequent use of the vehicle's computational resources requires the permission of the vehicle's owner. Therefore, simulation platform 100 can model, in vehicular edge layer 140, the uncertainty associated with a vehicle owner granting or denying permission.

Terrain and vehicle layer 150 models a particular specified terrain (e.g., an intersection, a traffic circle, a bridge, an expressway, an expressway on-ramp/off-ramp, etc.) and one or more moving vehicles 155 within the specified terrain. The set of input parameters for this layer can include the number of moving vehicles 155, the characteristics or specifications of the terrain model 153, and data (e.g., trajectories, roadways) regarding the paths of the moving vehicles 155.

Pedestrian layer 160 models both the behavior (e.g., physical movements) and activities (e.g., usage of network bandwidth via mobile communication devices such as smartphones) of pedestrians 165. In one embodiment, the set of input parameters for pedestrian layer 160 includes one or more of the following: a mobility model for one or more simulated pedestrians 165, the density of simulated pedestrians 165, and the level of usage, by one or more of the simulated pedestrians 165, of mobile devices such as smartphones that rely on network data services. This last parameter thus pertains to modeling the data traffic attributable to pedestrians 165.

Figure 2:
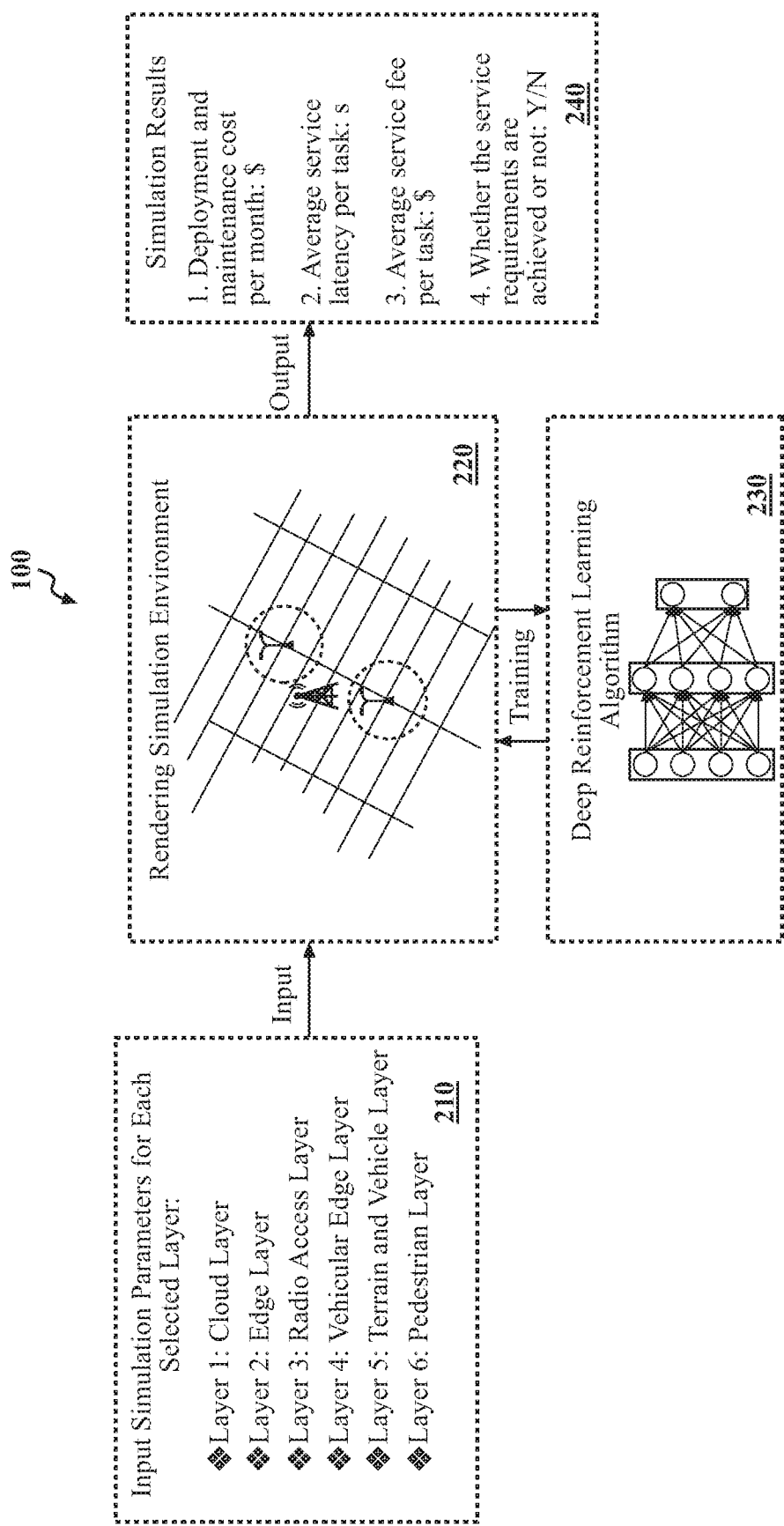
FIG. 2 is another diagram of a simulation platform for simulating edge-computing deployment in diverse terrains, in accordance with an illustrative embodiment of the invention.

FIG. 2 is another diagram of a simulation platform 100 for simulating edge-computing deployment in diverse terrains, in accordance with an illustrative embodiment of the invention. This diagram provides a different perspective regarding simulation platform 100. In FIG. 2, the sets of input parameters for the respective layers (block 210) selected by the layer-selection input is input to rendering simulation environment 220. In some embodiments, rendering simulation environment 220 benefits from Deep Reinforcement Learning (DRL) algorithm 230. DRL can provide a more scalable and accurate approach to implementing simulation platform 100 than conventional greedy-based heuristic algorithms. As indicated in FIG. 2, simulation platform 100 can output simulation results 240 that include performance data such as deployment and maintenance cost per month, average service latency per task, average service fee per task, and whether predetermined service requirements are achieved.

Figure 3:
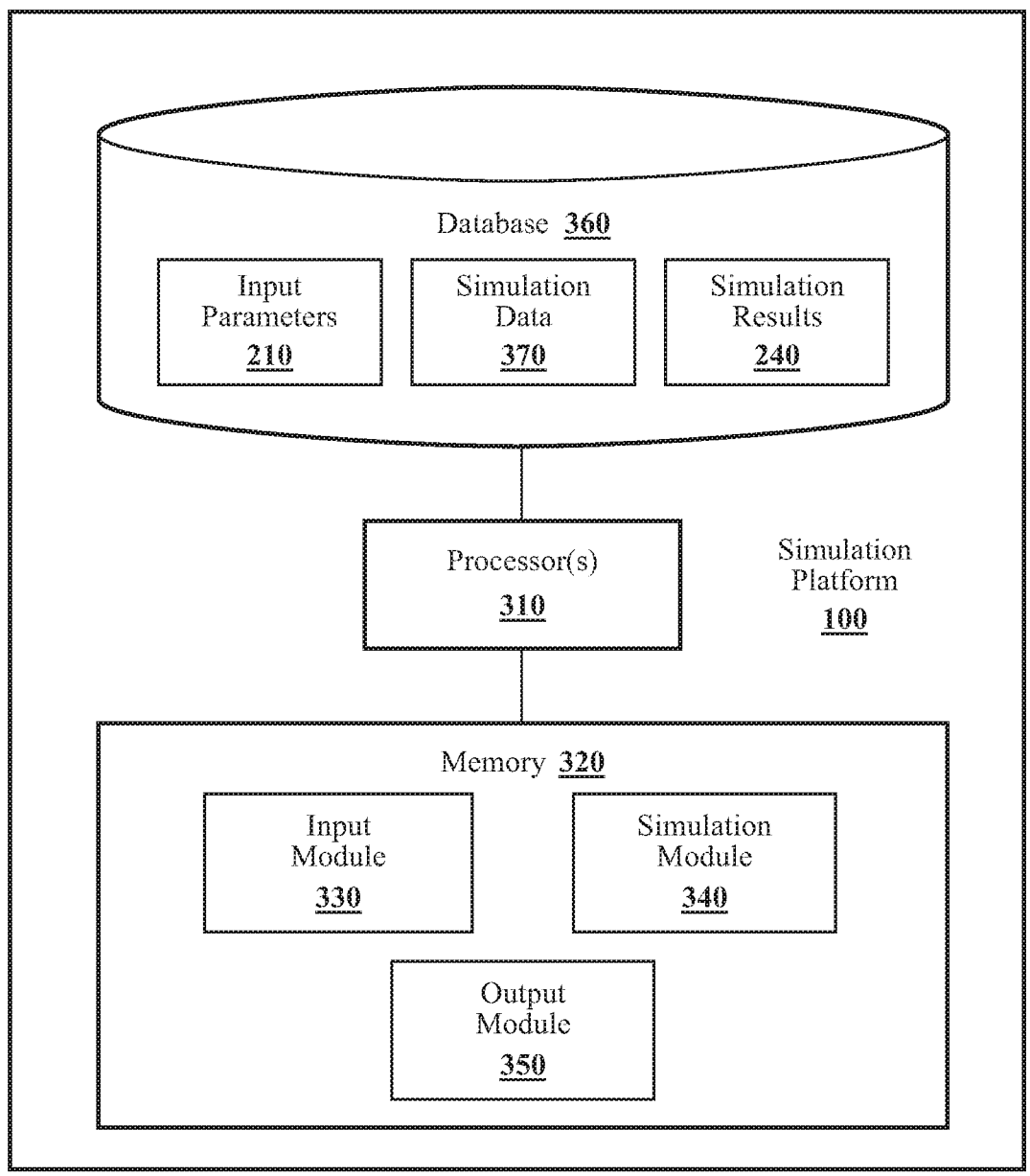
FIG. 3 is a functional block diagram of a simulation platform for simulating edge-computing deployment in diverse terrains, in accordance with an illustrative embodiment of the invention.

FIG. 3 is a functional block diagram of a simulation platform 100 for simulating edge-computing deployment in diverse terrains, in accordance with an illustrative embodiment of the invention. In FIG. 3, simulation platform 100 includes one or more processors 310 to which a memory 320 is communicably coupled. In one embodiment, memory 320 stores an input module 330, a simulation module 340, and an output module 350. The memory 320 is a random-access memory (RAM), read-only memory (ROM), a hard-disk drive, a flash memory, or other suitable memory for storing the modules 330, 340, and 350. The modules 330, 340, and 350 are, for example, computer-readable instructions that when executed by the one or more processors 310, cause the one or more processors 310 to perform the various functions disclosed herein. The sets of input parameters 210 for the selected layers that are active in a given simulation experiment can be stored in a database 360. The simulation results 240 and various types of temporary and persistent simulation data 370 can also be stored in database 360.

Input module 330 generally includes instructions that when executed by the one or more processors 310 cause the one or more processors 310 to receive a layer-selection input specifying which layers among the plurality of layers in a simulation model of an edge-computing deployment (i.e., simulation platform 100) are to be included in a simulation experiment. Herein, a "simulation experiment" refers to one or more "runs" or executions of simulation platform 100. Input module 330 also includes instructions that when executed by the one or more processors 310 cause the one or more processors 310 to receive a set of input parameters for each of the layers specified by the layer-selection input. As explained above, the set of input parameters for one of the layers specified by the layer-selection input (e.g., edge layer 115) includes selection of a vehicular application whose performance in the edge-computing deployment is to be evaluated via the simulation experiment. Examples of such vehicular applications include, without limitation, in-vehicle augmented reality, high-definition map generation, intelligent driving, and edge-assisted adaptive cruise control.

In some embodiments, input module 330 includes additional instructions that when executed by the one or more processors 310 cause the one or more processors 310 to receive, prior to execution of the simulation experiment, one or more inputs pertaining to evaluating an offloading strategy involving one or more of a cloud server 110 in the cloud layer 105, an edge server 120 in the edge layer 115, and one or more vehicular edge groups 145 in the vehicular edge layer 140. As mentioned above, in one embodiment, those inputs include specifying offloading priorities among the cloud server 110, the edge server 120, and the one or more vehicular edge groups 145. For example, such an input could specify that a task should always be offloaded to the vehicular edge layer 140 first, the edge server 120 and cloud server 110 being second and third choices, respectively.

Simulation module 340 generally includes instructions that when executed by the one or more processors 310 cause the one or more processors 310 to execute the simulation experiment in accordance with the layer-selection input and the set of input parameters for each of the layers specified by the layer-selection input. The layer-selection input permits a user to select different combinations of layers among the six layers discussed above, depending on the objectives of a particular simulation experiment. For example, in one embodiment, a user may choose to deploy only edge layer 115 (Layer 2), radio access layer 125 (Layer 3), vehicular edge layer 140 (Layer 4), and terrain and vehicle layer 150 (Layer 5). In this example, simulation module 340 can execute the simulation experiment in accordance with the sets of input parameters received from the user for the four deployed layers.

Output module 350 generally includes instructions that when executed by the one or more processors 310 cause the one or more processors 310 to output, from the simulation experiment, performance data for the selected vehicular application in the edge-computing deployment. For example, this performance data can be part of simulation results 240 discussed above and, in one embodiment, includes one or more of the following: deployment and maintenance cost per month, average service latency per task, average service fee per task, and whether predetermined service requirements are achieved.

Figure 4:
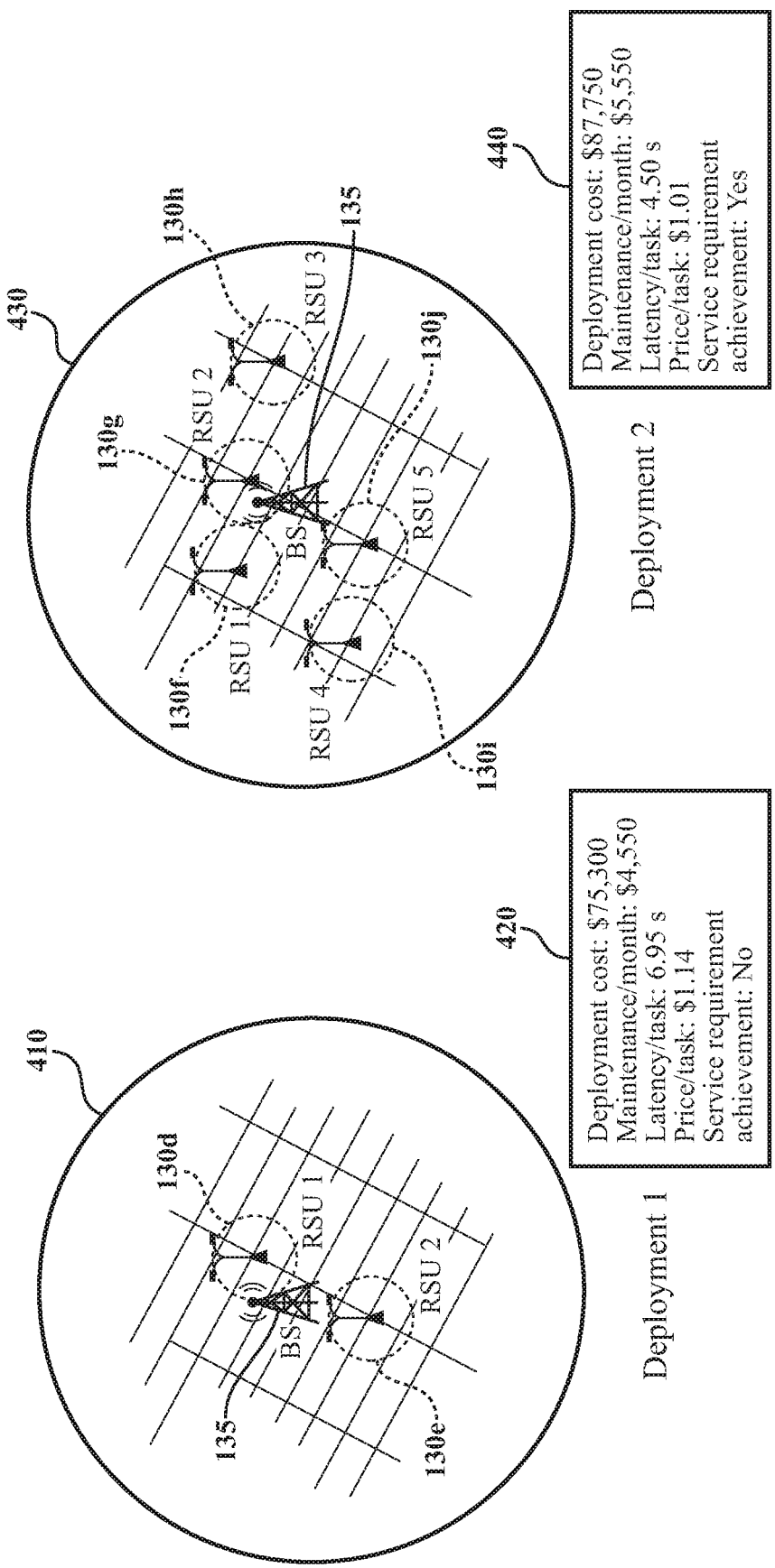
FIG. 4 illustrates a comparison of simulation results for two different edge-computing deployments, in accordance with an illustrative embodiment of the invention.

FIG. 4 illustrates a comparison of simulation results for two different edge-computing deployments (410 and 430), in accordance with an illustrative embodiment of the invention. As shown in FIG. 4, Deployment 1 (410) includes a single BS 135 and two RSUs, RSU 1 (130*d*) and RSU 2 (130*e*), at specified spatial positions. Deployment 2 (430) includes a single BS 135 and five RSUs, RSU 1 (130*f*), RSU 2 (130*g*), RSU 3 (130*h*), RSU 4 (130*i*) and RSU 5 (130*j*), at specified spatial positions. Output module 350 of simulation platform 100 presents Deployment 1 results 420 and Deployment 2 results 440 including the performance data summarized in FIG. 4. As this example illustrates, simulation platform 100 permits a user to compare the performance of a vehicular application and the associated deployment and maintenance costs between two different edge-computing deployments at a glance. In this example, Deployment 2, though it has a higher deployment and maintenance cost, provides a lower latency than Deployment 1 and achieves the required service, whereas Deployment 1 fails to achieve the service requirement.

Figure 5:
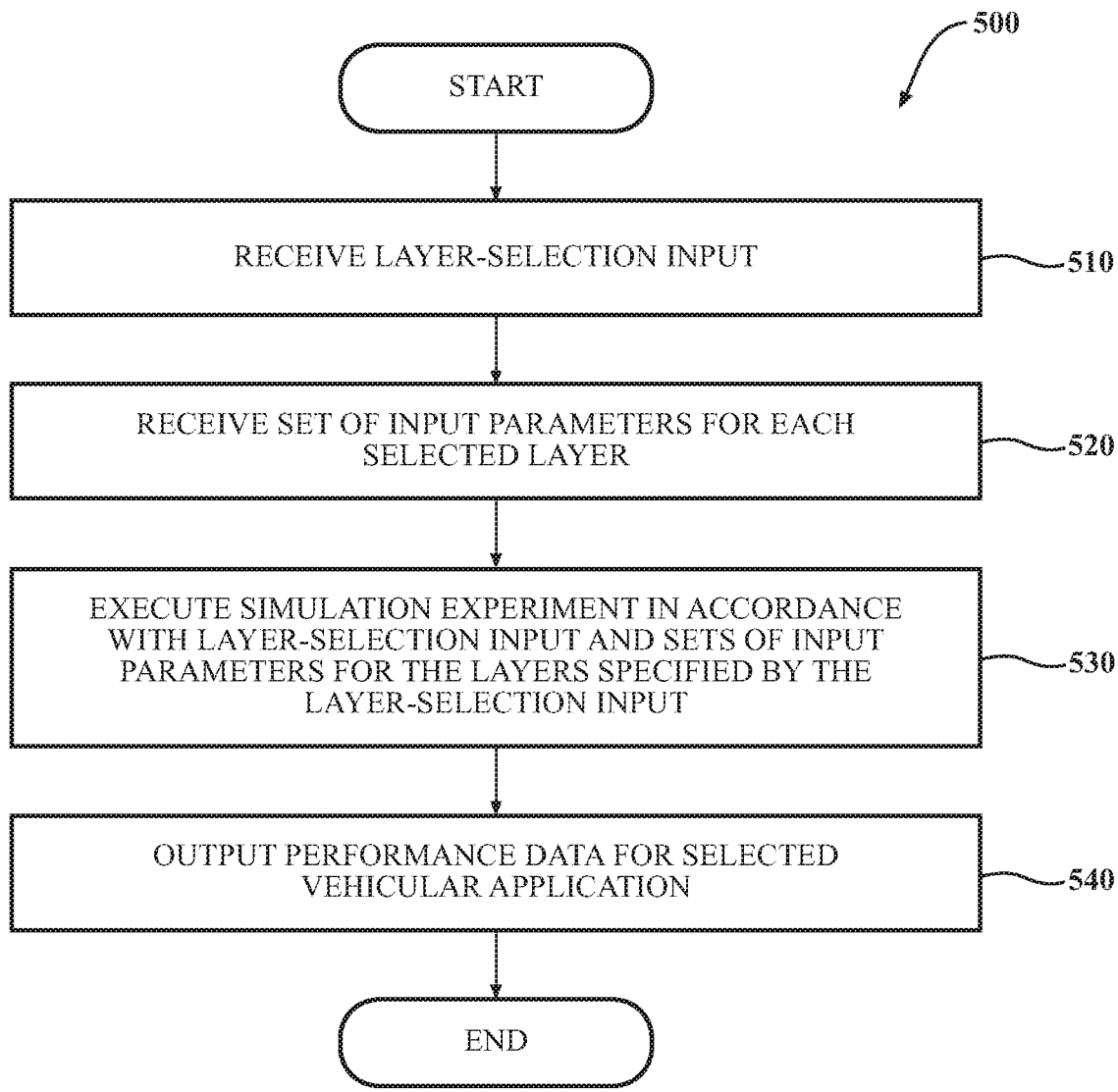
FIG. 5 is a flowchart of a method of simulating edge-computing deployment in diverse terrains, in accordance with an illustrative embodiment of the invention.

FIG. 5 is a flowchart of a method 500 of simulating edge-computing deployment in diverse terrains, in accordance with an illustrative embodiment of the invention. Method 500 will be discussed from the perspective of the simulation platform 100 in FIG. 3. While method 500 is discussed in combination with simulation platform 100, it should be appreciated that method 500 is not limited to being implemented within simulation platform 100, but simulation platform 100 is instead one example of a system that may implement method 500.

At block 510, input module 330 receives a layer-selection input specifying which layers among a plurality of layers in a simulation model of an edge-computing deployment (i.e., a simulation platform 100) are to be included in a simulation experiment. In some embodiments, the plurality of layers include a cloud layer 105, an edge layer 115, a radio access layer 125, a vehicular edge layer 140, a terrain and vehicle layer 150, and a pedestrian layer 160, as discussed above. As explained above, a user may choose to deploy a subset of the possible layers via the layer-selection input.

At block 520, input module 330 receives a set of input parameters for each of the layers specified by the layer-selection input. As discussed above, the set of input parameters for one of the layers specified by the layer-selection input (e.g., in one embodiment, edge layer 115) includes selection of a vehicular application whose performance in the edge-computing deployment is to be evaluated via the simulation experiment. Examples of vehicular applications include, without limitation, in-vehicle augmented reality, high-definition map generation, intelligent driving, and edge-assisted adaptive cruise control. In some embodiments, multiple vehicular applications can be selected simultaneously for evaluation during a given simulation experiment. Examples of the types of parameters that can be included in the sets of input parameters for the various layers of simulation platform 100 are discussed above.

At block 530, simulation module 340 executes the simulation experiment in accordance with the layer-selection input and the set of input parameters for each of the layers specified by the layer-selection input. As discussed above, the layer-selection input permits a user to select different combinations of layers among the six layers discussed above, depending on the objectives of a particular simulation experiment. For example, in one embodiment, a user may choose to deploy only edge layer 115 (Layer 2), radio access layer 125 (Layer 3), vehicular edge layer 140 (Layer 4), and terrain and vehicle layer 150 (Layer 5). In this example, simulation module 340 can execute the simulation experiment in accordance with the sets of input parameters received from the user for the four deployed layers.

At block 540, output module 350 outputs, from the simulation experiment, performance data for the selected vehicular application in the edge-computing deployment. As discussed above, the output performance data can include one or more of deployment and maintenance cost per month, average service latency per task, average service fee per task, and whether predetermined service requirements are achieved.

In other embodiments, method 500 includes actions that are not included in the flowchart of FIG. 5. For example, in one embodiment, method 500 includes input module 330 receiving, prior to execution of the simulation experiment, one or more inputs pertaining to evaluating an offloading strategy involving one or more of a cloud server 110 in the cloud layer 105, an edge server 120 in the edge layer 115, and one or more vehicular edge groups 145 in the vehicular edge layer 140. As discussed above, in some embodiments, the one or more inputs just mentioned that pertain to evaluating an offloading strategy include specifying offloading priorities among the cloud server 110, the edge server 120, and the one or more vehicular edge groups 145. For example, such an input could specify that a task should always be offloaded to the vehicular edge layer 140 first, the edge server 120 and cloud server 110 being second and third choices, respectively.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The components described above can be realized in hardware or a combination of hardware and software and can be realized in a centralized fashion in one processing system or in a distributed fashion where different elements are spread across several interconnected processing systems. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A system for simulating edge-computing deployment in diverse terrains, comprising:
 one or more processors; and
 a memory communicably coupled to the one or more processors and storing:
  an input module including instructions that when executed by the one or more processors cause the one or more processors to:
   receive a layer-selection input specifying which layers among a plurality of layers in a simulation model of an edge-computing deployment are to be included in a simulation experiment; and
   receive a set of input parameters for each of the layers specified by the layer-selection input, the set of input parameters for one of the layers specified by the layer-selection input including selection of a vehicular application whose performance in the edge-computing deployment is to be evaluated via the simulation experiment;
  a simulation module including instructions that when executed by the one or more processors cause the one or more processors to execute the simulation experiment in accordance with the layer-selection input and the set of input parameters for each of the layers specified by the layer-selection input; and an output module including instructions that when executed by the one or more processors cause the one or more processors to output, from the simulation experiment, performance data for the selected vehicular application in the edge-computing deployment.

2. The system of claim 1, wherein the selected vehicular application is one of in-vehicle augmented reality, high-definition map generation, intelligent driving, and edge-assisted adaptive cruise control.

3. The system of claim 1, wherein the plurality of layers include a cloud layer, an edge layer, a radio access layer, a vehicular edge layer, a terrain and vehicle layer, and a pedestrian layer.

4. The system of claim 3, wherein the input module includes further instructions that when executed by the one or more processors cause the one or more processors to receive, prior to execution of the simulation experiment, one or more inputs pertaining to evaluating an offloading strategy involving one or more of a cloud server in the cloud layer, an edge server in the edge layer, and one or more vehicular edge groups in the vehicular edge layer.

5. The system of claim 4, wherein the one or more inputs pertaining to evaluating an offloading strategy include specifying offloading priorities among the cloud server, the edge server, and the one or more vehicular edge groups.

6. The system of claim 3, wherein the set of input parameters for the cloud layer includes one or more of supported vehicular applications, selection of a communication model for communication between a cloud server in the cloud layer and one or more vehicles in the terrain and vehicle layer, a number of allocated virtual machines and their associated computational performance, and costs associated with a specified geographic region.

7. The system of claim 3, wherein the set of input parameters for the vehicular edge layer includes one or more of a number of vehicles in a vehicular edge group, a computational capacity of individual vehicles in the vehicular edge group, available communication bandwidth, a cost of data transmission service and computational resources, and options regarding availability of computational and storage resources in the individual vehicles in the vehicular edge group and a willingness of vehicle owners of the individual vehicles in the vehicular edge group to share the computational and storage resources.

8. The system of claim 3, wherein the set of input parameters for the pedestrian layer includes one or more of a mobility model for one or more simulated pedestrians, a density of simulated pedestrians, and a level of usage of mobile devices relying on data services by the one or more simulated pedestrians.

9. The system of claim 1, wherein the performance data for the selected vehicular application in the edge-computing deployment includes one or more of deployment and maintenance cost per month, average service latency per task, average service fee per task, and whether predetermined service requirements are achieved.

10. A non-transitory computer-readable medium for simulating edge-computing deployment in diverse terrains and storing instructions that when executed by one or more processors cause the one or more processors to:

receive a layer-selection input specifying which layers among a plurality of layers in a simulation model of an edge-computing deployment are to be included in a simulation experiment;

receive a set of input parameters for each of the layers specified by the layer-selection input, the set of input parameters for one of the layers specified by the layer-selection input including selection of a vehicular application whose performance in the edge-computing deployment is to be evaluated via the simulation experiment;

execute the simulation experiment in accordance with the layer-selection input and the set of input parameters for each of the layers specified by the layer-selection input; and output, from the simulation experiment, performance data for the selected vehicular application in the edge-computing deployment.

11. The non-transitory computer-readable medium of claim 10, wherein the performance data for the selected vehicular application in the edge-computing deployment includes one or more of deployment and maintenance cost per month, average service latency per task, average service fee per task, and whether predetermined service requirements are achieved.

12. A method of simulating edge-computing deployment in diverse terrains, the method comprising:

receiving a layer-selection input specifying which layers among a plurality of layers in a simulation model of an edge-computing deployment are to be included in a simulation experiment;

receiving a set of input parameters for each of the layers specified by the layer-selection input, the set of input parameters for one of the layers specified by the layer-selection input including selection of a vehicular application whose performance in the edge-computing deployment is to be evaluated via the simulation experiment;

executing the simulation experiment in accordance with the layer-selection input and the set of input parameters for each of the layers specified by the layer-selection input; and outputting, from the simulation experiment, performance data for the selected vehicular application in the edge-computing deployment.

13. The method of claim 12, wherein the selected vehicular application is one of in-vehicle augmented reality, high-definition map generation, intelligent driving, and edge-assisted adaptive cruise control.

14. The method of claim 12, wherein the plurality of layers include a cloud layer, an edge layer, a radio access layer, a vehicular edge layer, a terrain and vehicle layer, and a pedestrian layer.

15. The method of claim 14, further comprising receiving, prior to execution of the simulation experiment, one or more inputs pertaining to evaluating an offloading strategy involving one or more of a cloud server in the cloud layer, an edge server in the edge layer, and one or more vehicular edge groups in the vehicular edge layer.

16. The method of claim 15, wherein the one or more inputs pertaining to evaluating an offloading strategy include specifying offloading priorities among the cloud server, the edge server, and the one or more vehicular edge groups.

17. The method of claim 14, wherein the set of input parameters for the cloud layer includes one or more of supported vehicular applications, selection of a communication model for communication between a cloud server in the cloud layer and one or more vehicles in the terrain and vehicle layer, a number of allocated virtual machines and their associated computational performance, and costs associated with a specified geographic region.

18. The method of claim 14, wherein the set of input parameters for the vehicular edge layer includes one or more of a number of vehicles in a vehicular edge group, a computational capacity of individual vehicles in the vehicular edge group, available communication bandwidth, a cost of data transmission service and computational resources, and options regarding availability of computational and storage resources in the individual vehicles in the vehicular edge group and a willingness of vehicle owners of the individual vehicles in the vehicular edge group to share the computational and storage resources.

19. The method of claim 14, wherein the set of input parameters for the pedestrian layer includes one or more of a mobility model for one or more simulated pedestrians, a density of simulated pedestrians, and a level of usage of mobile devices relying on data services by the one or more simulated pedestrians.

20. The method of claim 12, wherein the performance data for the selected vehicular application in the edge-computing deployment includes one or more of deployment and maintenance cost per month, average service latency per task, average service fee per task, and whether predetermined service requirements are achieved.

\* \* \* \* \*